United States Patent
Li

(10) Patent No.: US 9,807,739 B2
(45) Date of Patent: Oct. 31, 2017

(54) METHOD AND APPARATUS TO HANDLE TTI (TRANSMISSION TIME INTERVAL) BUNDLING IN A WIRELESS COMMUNICATION SYSTEM

(71) Applicant: INNOVATIVE SONIC CORPORATION, Taipei (TW)

(72) Inventor: Ming-Che Li, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 80 days.

(21) Appl. No.: 14/068,411

(22) Filed: Oct. 31, 2013

(65) Prior Publication Data

US 2014/0119305 A1 May 1, 2014

Related U.S. Application Data

(60) Provisional application No. 61/721,243, filed on Nov. 1, 2012.

(51) Int. Cl.
*H04W 72/04* (2009.01)
*H04W 52/14* (2009.01)
(Continued)

(52) U.S. Cl.
CPC ....... *H04W 72/0413* (2013.01); *H04L 5/0082* (2013.01); *H04W 52/146* (2013.01);
(Continued)

(58) Field of Classification Search
None
See application file for complete search history.

(56) References Cited

U.S. PATENT DOCUMENTS

| 2009/0259911 A1 | 10/2009 | Tseng |
| 2009/0307554 A1 | 12/2009 | Marinier et al. |

(Continued)

FOREIGN PATENT DOCUMENTS

| TW | I320648 | 2/2010 |
| TW | 201010328 A1 | 3/2010 |

(Continued)

OTHER PUBLICATIONS

Office Action on corresponding TW Patent Application No. 102139259 dated Jul. 2, 2015.

(Continued)

*Primary Examiner* — Chi H Pham
*Assistant Examiner* — Raul Rivas
(74) *Attorney, Agent, or Firm* — Blue Capital Law Firm, P.C.

(57) ABSTRACT

A method and apparatus are disclosed to handle TTI bundling. In an embodiment implemented in a UE (User Equipment), the method includes configuring the UE with a plurality of serving cells, wherein the TTI bundling and secondary cells with configured UL (uplink) could be simultaneously configured for the UE. In an embodiment from the perspective of a network, the method includes issuing, from a E-UTRAN (Evolved Universal Terrestrial Radio Access Network), a message to configure a UE with a plurality of serving cells, wherein the E-UTRAN could simultaneously configure the TTI bundling and the secondary cells with configured UL for the UE.

12 Claims, 6 Drawing Sheets

(51) Int. Cl.
  *H04L 5/00* (2006.01)
  *H04W 52/28* (2009.01)
  *H04W 52/32* (2009.01)
  *H04W 52/36* (2009.01)
  *H04W 52/40* (2009.01)
  *H04W 72/00* (2009.01)

(52) U.S. Cl.
  CPC ....... *H04W 52/281* (2013.01); *H04W 52/325* (2013.01); *H04W 52/367* (2013.01); *H04W 52/40* (2013.01); *H04W 72/005* (2013.01); *H04L 5/001* (2013.01); *H04L 5/0023* (2013.01); *H04L 5/0035* (2013.01); *H04L 5/0053* (2013.01); *Y02B 60/50* (2013.01)

(56) References Cited

U.S. PATENT DOCUMENTS

| | | |
|---|---|---|
| 2012/0113831 A1 | 5/2012 | Pelletier et al. |
| 2012/0140689 A1* | 6/2012 | Pelletier .............. H04W 76/048 370/311 |
| 2012/0140690 A1* | 6/2012 | Choi et al. .................... 370/311 |
| 2012/0147830 A1* | 6/2012 | Lohr et al. ..................... 370/329 |
| 2013/0142175 A1* | 6/2013 | Manssour ......... H04W 72/1252 370/336 |
| 2013/0294390 A1* | 11/2013 | Yang ..................... H04W 52/34 370/329 |

FOREIGN PATENT DOCUMENTS

| | | |
|---|---|---|
| TW | 201032522 A1 | 9/2010 |
| TW | M390617 | 10/2010 |

OTHER PUBLICATIONS

Office Action on corresponding TW Patent Application No. 102139259 dated May 19, 2016.

Office Action on corresponding TW Patent Application No. 102139259 dated Sep. 13, 2016.

* cited by examiner

METHOD AND APPARATUS TO HANDLE TTI (TRANSMISSION TIME INTERVAL) BUNDLING IN A WIRELESS COMMUNICATION SYSTEM

CROSS-REFERENCE TO RELATED APPLICATIONS

The present Application claims the benefit of U.S. Provisional Patent Application Ser. No. 61/721,243 filed on Nov. 1, 2012, the entire disclosure of which is incorporated herein by reference.

FIELD

This disclosure generally relates to wireless communication networks, and more particularly, to a method and apparatus to handle TTI bundling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to handle TTI bundling. In an embodiment implemented in a UE (User Equipment), the method includes configuring a UE (User Equipment) with a plurality of serving cells, wherein the TTI bundling and secondary cells with configured UL (uplink) could be simultaneously configured for the UE. In an embodiment from the perspective of a network, the method includes issuing, from a E-UTRAN (Evolved Universal Terrestrial Radio Access Network), a message to configure the UE with a plurality of serving cells, wherein the E-UTRAN could simultaneously configure the TTI bundling and the secondary cells with configured UL for the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-120838, "Summary of 3GPP TSG-RAN Workshop on Release 12 and Onward", TSG-RAN Chairman; RWS-120046, "Technologies for Rel-12 and Onwards", Samsung; RWS-120003, "LTE Release 12 and Beyond", Ericsson, ST-Ericsson; TS 36.331 V11.1.0, "E-UTRA Radio Resource Control (RRC) (Release 11)"; and TS 36.213 V11.0.0, "E-UTRA Physical layer procedures (Release 11)". The standards and documents listed above are hereby expressly incorporated herein.

Figure 1:
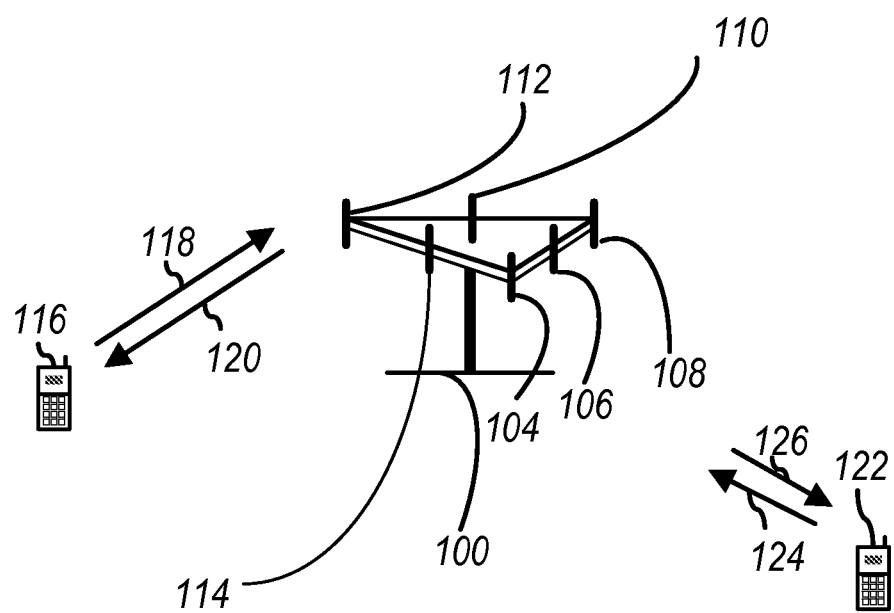
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
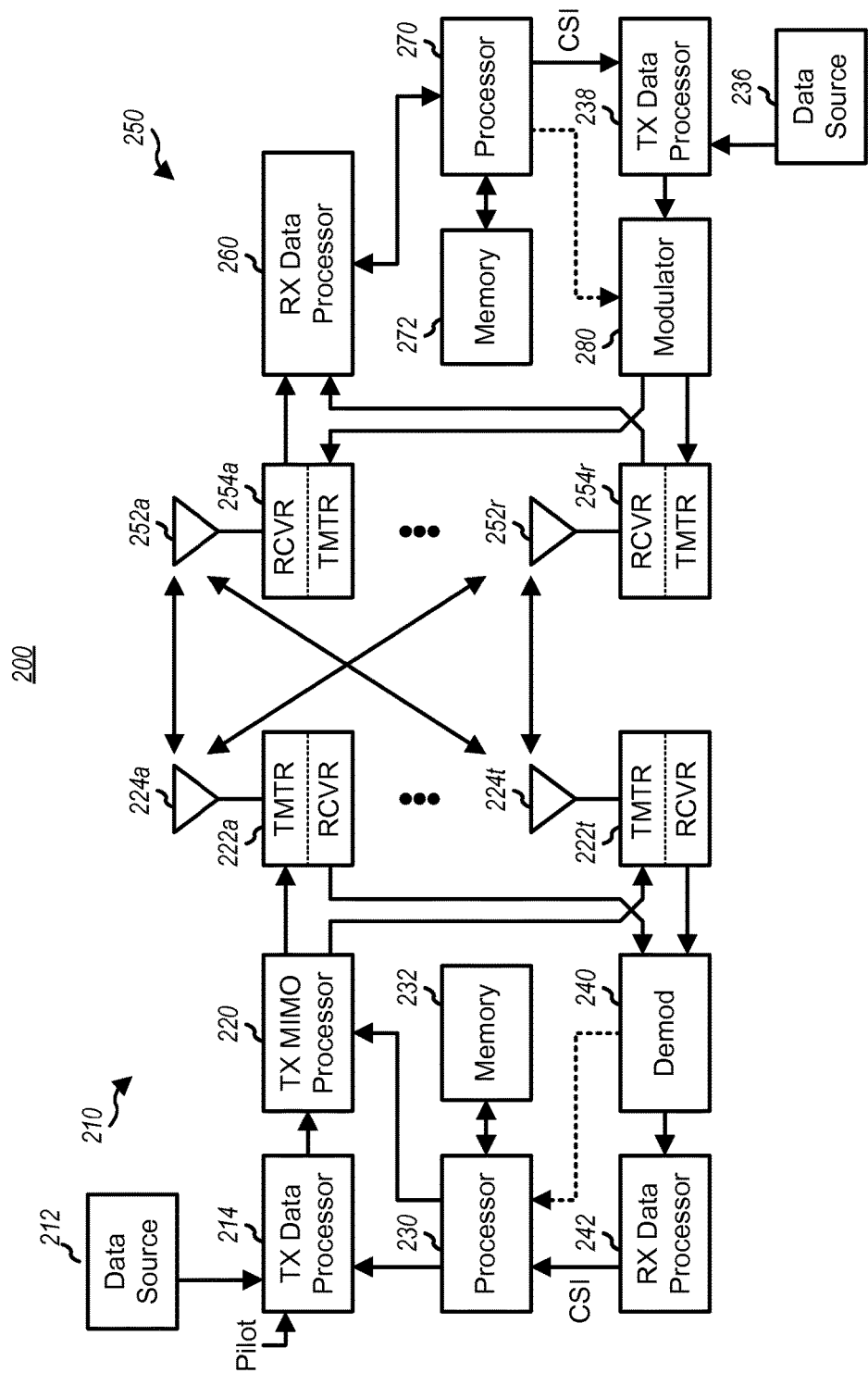
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
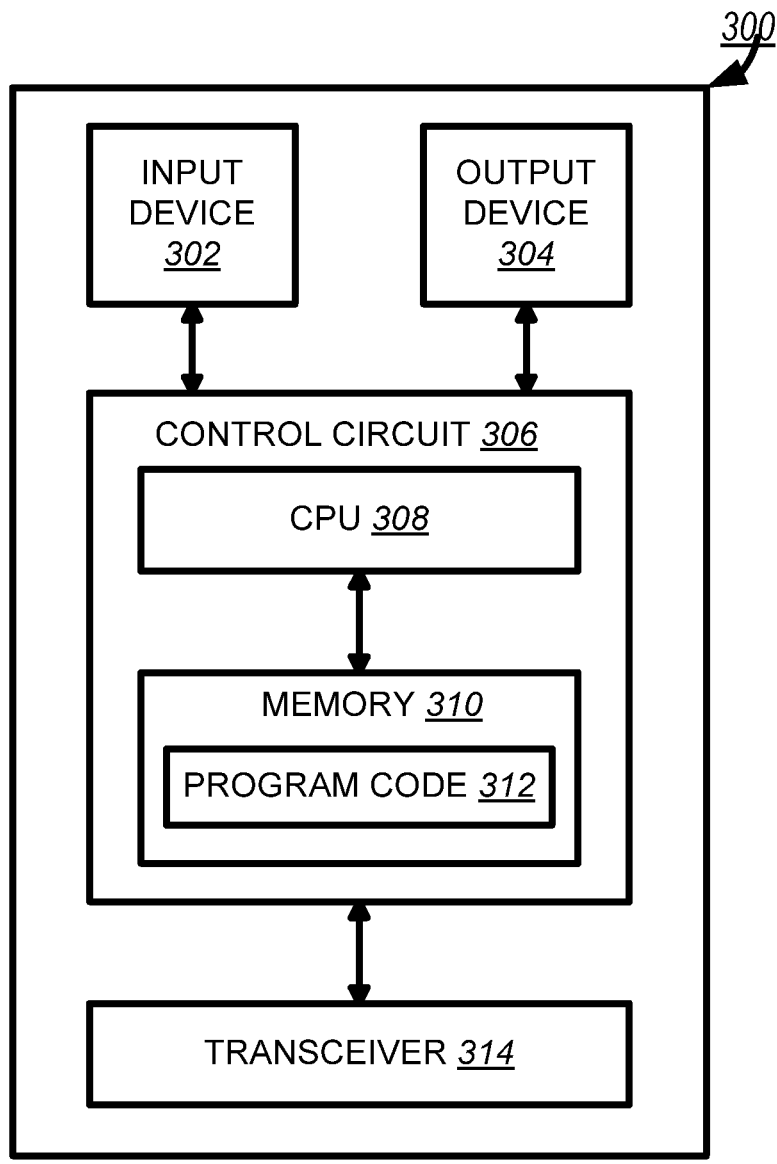
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
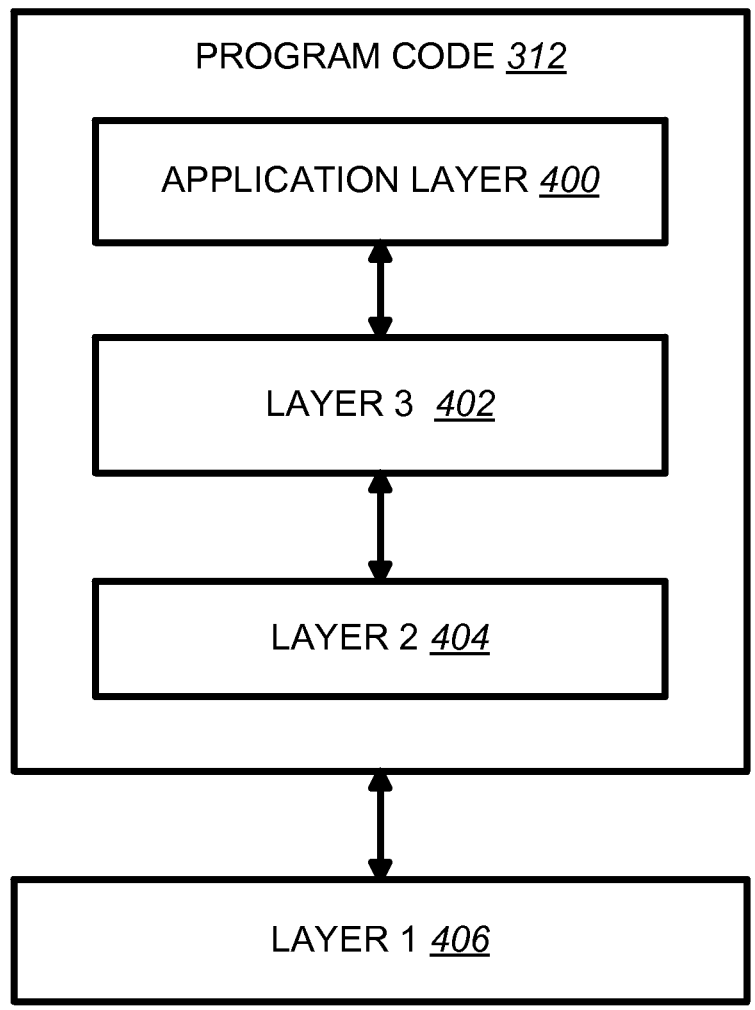
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As shown in 3GPP RP-120838, there was much interest in Enhanced Small Cell for LTE. Technologies proposed by many members include inter site Carrier Aggregation (CA) as discussed in 3GPP RWS-120046, and frequency separation between macro and small cells with higher frequency band (e.g., 3.5 GHz band) for the small cells as discussed in 3GPP RWS-120003.

In LTE Rel. 10/11, only intra-eNB CA is considered. For a Rel. 10/11 UE, subframe bundling operation (TTI bundling) is configured by parameter ttiBundling provided by higher layers. The subframe bundling operation is not simultaneously configured with UL CA according to the following description in 3GPP TS 36.213 V11.0.0:
ttiBundling
TRUE indicates that TTI bundling TS 36.321 [6] is enabled while FALSE indicates that TTI bundling is disabled. TTI bundling can be enabled for FDD and for TDD only for configurations 0, 1 and 6. For TDD, E-UTRAN does not simultaneously enable TTI bundling and semi-persistent scheduling in this release of specification. Furthermore, E-UTRAN does not simultaneously configure TTI bundling and SCells with configured uplink.

For a Rel.10/11 UE configured with carrier aggregation, the delivering behavior of uplink control information is specified in 3GPP TS 36.213 V11.0.0 as follows:

If the UE is configured with more than one serving cell and is not configured for simultaneous PUSCH and PUCCH transmission, then in subframe n UCI shall be transmitted

- on PUCCH using format 1/1a/1b/3 or 2/2a/2b if the UE is not transmitting PUSCH
- on PUSCH of the serving cell given in section 7.2.1 if the UCI consists of aperiodic CSI or aperiodic CSI and HARQ-ACK
- on primary cell PUSCH if the UCI consists of periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted
- on PUSCH of the secondary cell with smallest SCellIndex if the UCI consists of periodic CSI and/or HARQ-ACK and if the UE is not transmitting PUSCH on primary cell but is transmitting PUSCH on at least one secondary cell If the UE is configured with more than one serving cell and simultaneous PUSCH and PUCCH transmission, then in subframe n UCI shall be transmitted

- on PUCCH using format 1/1a/1b/3 if the UCI consists only of HARQ-ACK and/or SR
- on PUCCH using format 2 if the UCI consists only of periodic CSI
- as described in section 10.1.1, if the UCI consists of periodic CSI and HARQ-ACK and if the UE is not transmitting on PUSCH
- on PUCCH and primary cell PUSCH if the UCI consists of HARQ-ACK and periodic CSI and the UE is transmitting PUSCH on the primary cell, in which case the HARQ-ACK is transmitted on PUCCH using format 1a/1b/3 and the periodic CSI is transmitted on PUSCH unless the primary cell PUSCH transmission corresponds to a Random Access Response Grant or a retransmission of the same transport block as part of the contention based random access procedure, in which case periodic CSI is not transmitted
- on PUCCH and PUSCH of the secondary cell with the smallest SCellIndex if the UCI consists of HARQ-ACK and periodic CSI and if the UE is not transmitting PUSCH on primary cell but is transmitting PUSCH on at least one secondary cell, in which case, the HARQ-ACK is transmitted on PUCCH using format 1a/1b/3 and the periodic CSI is transmitted on PUSCH
- on PUCCH and PUSCH if the UCI consists of HARQ-ACK/HARQ-ACK+SR/positive SR and aperiodic CSI in which case the HARQ-ACK/HARQ-ACK+SR/positive SR is transmitted on PUCCH using format 1/1a/1b/3 and the aperiodic CSI is transmitted on PUSCH of the serving cell given in Section 7.2.1

If the UE is configured with more than one serving cell, then reporting prioritization and collision handling of periodic CSI reports of a certain PUCCH reporting type is given in Section 7.2.2.

A UE transmits PUCCH only on the primary cell.

Furthermore 3GPP RWS-120046 proposes inter-eNB CA (Carrier Aggregation) and its corresponding architecture for LTE Rel.12. As discussed in 3GPP RWS-120046, the macro-cell layer f1 is controlled by serving eNB for mobility robustness, and the small cells in f2 is controlled by the drift eNB (D-eNB) for throughput boost. To reduce the interface loading between the serving eNB and the drift eNB, self-operating D-eNBs could be enabled with some RAN1/2 enhancements, such as D-eNB UL Control Info handling and RACH (Random Access Channel) Msg2 from the D-eNB.

In legacy release in general, when the subframe bundling operation (TTI bundling) is configured, the UE is not expected to be configured with UL carrier aggregation (i.e., configured with secondary cells with configured UL) because the intra-eNB CA is mainly utilized for throughput boost of the cell-center UE. However, in the scenario of inter-eNB CA, it may be possible that the UE in the macro cell edge is also within the coverage of small cell. Under the circumstances, the constraint of subframe bundling operation would limit the gain of small cell enhancement.

The general concept of the invention is to allow E-UTRAN to simultaneously configure TTI bundling and SCells (Secondary Cells) with configured UL for an UE. Furthermore, if an UE configured with CA has information about inter-eNB CA, the TTI bundling and the SCells with configured UL could be simultaneously configured; otherwise, the legacy constraint would still exist for intra-eNB CA.

Figure 5:
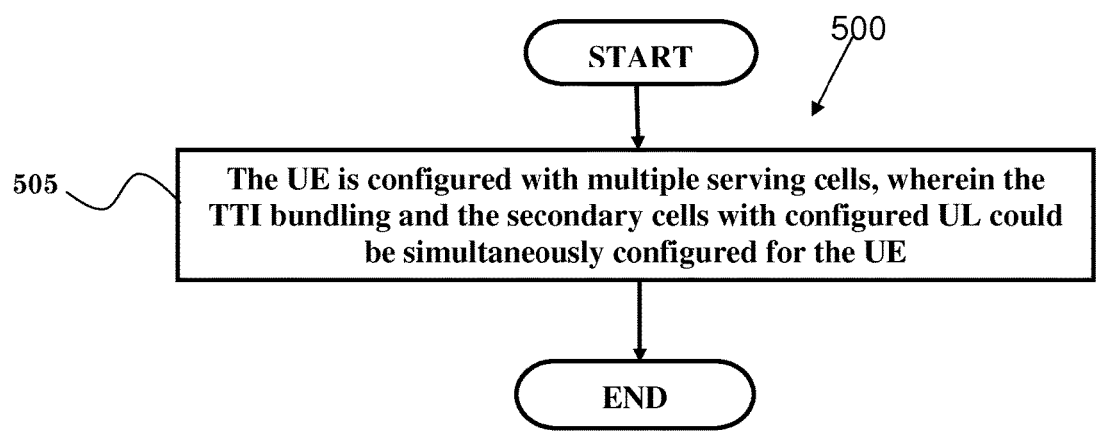
FIG. 5 is a flow chart according to one exemplary embodiment.

FIG. 5 is a flow chart 500 from the perspective of a UE in accordance with one exemplary embodiment. In step 505, the UE is configured with a plurality of serving cells, wherein the TTI bundling and secondary cells with configured UL could be simultaneously configured for the UE.

Figure 6:
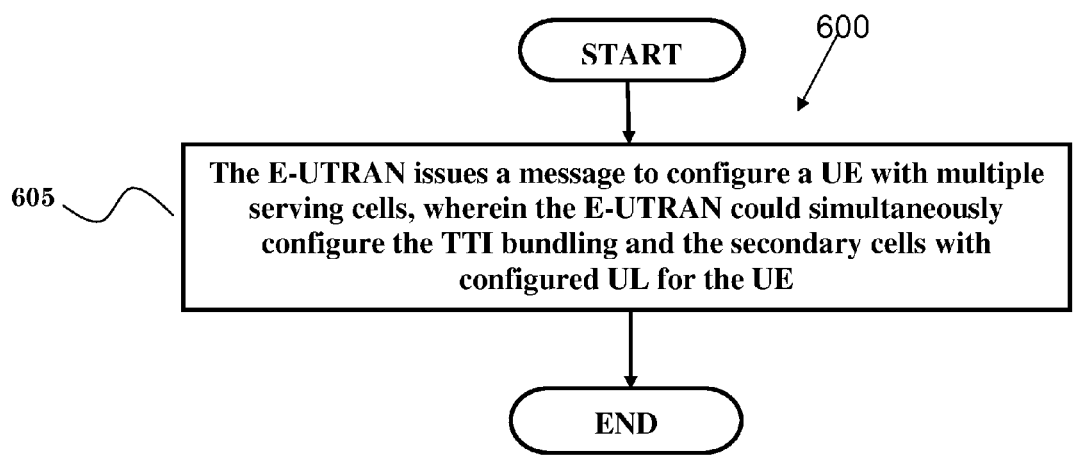
FIG. 6 is a flow chart according to one exemplary embodiment.

FIG. 6 is a flow chart 600 from the perspective of the network in accordance with on exemplary embodiment. In step 605, the E-UTRAN (Evolved Universal Terrestrial Radio Access Network) issues a message to configure the UE with a plurality of serving cells, wherein the E-UTRAN could simultaneously configure the TTI bundling and the secondary cells with configured UL for the UE.

In one embodiment, if the UE has sufficient configuration information to know that the configured serving cells with configured uplink are configured or scheduled by different eNBs, the TTI bundling and the secondary cells with configured uplink could be simultaneously configured for the UE. Alternatively, if the UE has sufficient configuration information to know that the configured serving cells with configured UL are configured or scheduled by a same eNB, the TTI bundling and the secondary cells with configured UL would not be simultaneously configured for the UE. Also, if the UE has no configuration information to know whether the configured serving cells with configured UL are configured or scheduled by different eNBs or not, the TTI bundling and the secondary cells with configured UL would not be simultaneously configured for the UE. In addition, the configuration information is the cell type of the configured serving cell with configured UL, including macro cell, femto cell, pico cell, or small cell. The configuration could also be a field to indicate inter-eNB CA (Carrier Aggregation) or intra-eNB CA. Furthermore, the configuration information could be some indication that a plurality of PUCCH (Physical Uplink Control Channel) groups are configured for the UE.

In one embodiment, the TTI bundling is configured for (i) a serving cell, which is a macro cell, with configured uplink, or (ii) a serving cell, which is a primary cell, with configured uplink that belongs to a PUCCH (Physical Uplink Control Channel) group. Also, the TTI bundling is not configured for (i) any serving cells, which are not macro cells, with configured UL, or (ii) any serving cells, which are not primary cells, with configured UL that belong to a PUCCH (Physical Uplink Control Channel) group.

Referring back to FIGS. 3 and 4, in one embodiment, the device 300 includes a program code 312 stored in memory 310. In one embodiment, the CPU 308 could execute the program code 312 to configure a UE with a plurality of serving cells, wherein the TTI bundling and secondary cells with configured UL could be simultaneously configured for the UE. In addition, the CPU 308 could execute the program code 312 to perform all of the above-described actions and steps or others described herein.

Referring back to FIGS. 3 and 4, in one embodiment, the device 300 includes a program code 312 stored in memory 310. In one embodiment, the CPU 308 could execute the program code 312 to enable the E-UTRAN to issue a message to configure a UE with a plurality of serving cells, wherein the E-UTRAN could simultaneously configure the TTI bundling and the secondary cells with configured UL for the UE. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the inven-

What is claimed is:

1. A method to handle TTI (Transmission Time Interval) bundling, comprising:
   configured, for a UE (User Equipment), with a plurality of serving cells,
   wherein if the configured serving cells with configured uplink (UL) are configured or scheduled by different eNBs, the TTI bundling and secondary cells with configured UL (uplink) are allowed to be simultaneously configured for the UE, and
   wherein the TTI bundling and the secondary cells with configured UL are not simultaneously configured for the UE if the UE has sufficient configuration information to know that the configured serving cells with configured UL are configured or scheduled by a same eNB, or if the UE has no configuration information to know whether the configured serving cells with configured UL are configured or scheduled by different eNBs or not.

2. The method of claim 1, wherein whether the configured serving cells with configured UL for the UE are configured or scheduled by different eNBs (evolved Node B) is indicated by configuration information of the cell type of the configured serving cell with configured UL, including macro cell, femto cell, pico cell, or small cell.

3. The method of claim 1, wherein whether the configured serving cells with configured UL for the UE are configured or scheduled by different eNBs (evolved Node B) is indicated by configuration information that a plurality of PUCCH (Physical Uplink Control Channel) groups are configured for the UE.

4. The method of claim 1, wherein whether the configured serving cells with configured UL for the UE are configured or scheduled by different eNBs (evolved Node B) is indicated by configuration information of a field used to indicate inter-eNB CA (Carrier Aggregation) or intra-eNB CA.

5. The method of claim 1, wherein the TTI bundling is configured for (i) a serving cell, which is a macro cell, with configured UL, or (ii) a serving cell, which is a primary cell, with configured UL that belongs to a PUCCH (Physical Uplink Control Channel) group.

6. The method of claim 1, wherein the TTI bundling is not configured for (i) any serving cells, which are not macro cells, with configured UL, or (ii) any serving cells, which are not primary cells, with configured UL that belong to a PUCCH (Physical Uplink Control Channel) group.

7. A communication device to handle TTI (Transmission Time Interval) bundling, the communication device comprising:
   a control circuit;
   a processor installed in the control circuit;
   a memory installed in the control circuit and operatively coupled to the processor;
   wherein the processor is configured to execute a program code stored in the memory to:
      configure a UE (User Equipment) with a plurality of serving cells,
      wherein if the configured serving cells with configured uplink (UL) are configured or scheduled by different eNBs, the TTI bundling and secondary cells with configured UL (uplink) are allowed to be simultaneously configured for the UE, and
      wherein the TTI bundling and the secondary cells with configured UL are not simultaneously configured for the UE if the UE has sufficient configuration information to know that the configured serving cells with configured UL are configured or scheduled by a same eNB, or if the UE has no configuration information to know whether the configured serving cells with configured UL are configured or scheduled by different eNBs or not.

8. The communication device of claim 7, wherein whether the configured serving cells with configured UL for the UE are configured or scheduled by different eNBs (evolved Node B) is indicated by configuration information of the cell type of the configured serving cell with configured UL, including macro cell, femto cell, pico cell, or small cell.

9. The communication device of claim 7, wherein whether the configured serving cells with configured UL for the UE are configured or scheduled by different eNBs (evolved Node B) is indicated by configuration information that a plurality of PUCCH (Physical Uplink Control Channel) groups are configured for the UE.

10. The communication device of claim 7, wherein whether the configured serving cells with configured UL for the UE are configured or scheduled by different eNBs (evolved Node B) is indicated by configuration information of a field used to indicate inter-eNB CA (Carrier Aggregation) or intra-eNB CA.

11. The communication device of claim 7, wherein the TTI bundling is configured for (i) a serving cell, which is a macro cell with configured UL, or (ii) a serving cell, which is a primary cell, with configured UL that belongs to a PUCCH (Physical Uplink Control Channel) group.

12. The communication device of claim 7, wherein the TTI bundling is not configured for (i) any serving cells, which are not macro cell, with configured UL, or (ii) any serving cells, which are not primary cells, with configured UL that belong to a PUCCH (Physical Uplink Control Channel) group.

* * * * *